United States Patent
Gold et al.

(10) Patent No.: US 8,914,687 B2
(45) Date of Patent: Dec. 16, 2014

(54) PROVIDING TEST COVERAGE OF INTEGRATED ECC LOGIC EN EMBEDDED MEMORY

(75) Inventors: Spencer M. Gold, Pepperell, MA (US); Arun B. Hegde, Bangalore (IN)

(73) Assignee: Advanced Micro Devices, Inc., Sunnyvale, CA (US)

( * ) Notice: Subject to any disclaimer, the term of this patent is extended or adjusted under 35 U.S.C. 154(b) by 830 days.

(21) Appl. No.: 13/087,808

(22) Filed: Apr. 15, 2011

(65) Prior Publication Data

US 2012/0266033 A1   Oct. 18, 2012

(51) Int. Cl.
  *G11C 29/00*   (2006.01)
  *G06F 11/10*   (2006.01)
  *G11C 29/02*   (2006.01)
  *G06F 11/22*   (2006.01)
  *G11C 29/04*   (2006.01)

(52) U.S. Cl.
  CPC .... *G06F 11/2215* (2013.01); *G11C 2029/0411* (2013.01); *G06F 11/1052* (2013.01); *G06F 2217/70* (2013.01); *G11C 29/02* (2013.01)
  USPC .......................................................... 714/718

(58) Field of Classification Search
  CPC ........ G11C 29/56; G11C 29/48; G11C 29/44; G11C 29/50; H05K 999/99
  USPC .......................................................... 714/718
  See application file for complete search history.

(56) References Cited

U.S. PATENT DOCUMENTS

| | | | | |
|---|---|---|---|---|
| 6,219,807 B1 * | 4/2001 | Ebihara et al. | ................ | 714/720 |
| 8,321,737 B2 * | 11/2012 | Sasaki | ............ | 714/748 |
| 8,572,444 B2 * | 10/2013 | Lee et al. | ...................... | 714/719 |
| 2010/0162056 A1 * | 6/2010 | Higashino | .................... | 714/718 |
| 2011/0225475 A1 * | 9/2011 | Kumar et al. | ................. | 714/763 |

\* cited by examiner

*Primary Examiner* — Albert Decady
*Assistant Examiner* — Enam Ahmed

(57) ABSTRACT

A method is provided in which a first error test may be performed on a memory that includes an integrated error correcting code (ECC) portion. The functionality of the ECC portion may be bypassed in the first error test. A second error test may be performed on the memory, where the second error test includes testing the functionality of the ECC portion. Also provided is an apparatus including a memory device and an error correcting code (ECC) circuit. The apparatus also includes a first switching device adapted to select a first input signal or a second input signal and a second switching device adapted to select one of a signal from the memory device or a signal from a portion of the ECC circuit. Also provided are computer readable storage devices encoded with data for adapting a manufacturing facility to create the apparatus and for adapting a processor to perform the method above.

20 Claims, 10 Drawing Sheets

US 8,914,687 B2

PROVIDING TEST COVERAGE OF INTEGRATED ECC LOGIC IN EMBEDDED MEMORY

BACKGROUND

1. Field of the Invention

Embodiments of this invention relate generally to computers, and, more particularly, to a method, system and apparatus for providing test coverage of integrated ECC logic in embedded SRAMs.

2. Description of Related Art

Memory structures, or memory, such as Random Access Memories (RAMs) and Static RAMs (SRAMs), have evolved to include error correcting codes (ECC) and circuitry, and are implemented in increasingly smaller silicon technologies. As memory technologies have decreased in size, so too has the space available for placement of logic and circuitry that accompanies memory structures. With increased restrictions on size and placement for memory structures comes greater restrictions on testability of these memories.

Typically, in modern implementations for testing memory structures, error correcting codes (ECC) in embedded (or compiled) memories can be used to improve a product's overall soft error rate (SER). Embedded memories have typically implemented ECC capabilities by externally attaching the ECC logic to the outside of the memory. While this is a straight forward solution for adding ECC to existing embedded memories, it also makes a very significant negative impact on cycle time and overall memory area. Because the externally attached ECC logic exists outside of the compiled memory, it can be tested with traditional automatic test pattern generation (ATPG) methods, but integrated ECC logic will face numerous testing challenges.

SUMMARY OF EMBODIMENTS OF THE INVENTION

In one aspect of the present invention, a method is provided. The method includes performing a first error test on a memory, where the memory comprises an integrated error correcting code (ECC) portion, and where the functionality of the ECC portion is bypassed during the first memory test. The method also includes performing a second error test of the memory, where the second error test includes testing the functionality of the ECC portion.

In another aspect of the invention, an apparatus is provided. The apparatus includes a memory device and an error correcting code (ECC) circuit communicatively coupled to the memory device. The apparatus also includes a first switching device communicatively coupled to the memory device and a first portion of the ECC circuit, the first switching device being adapted to select at least one of a first input signal or a second input signal. The apparatus also includes a second switching device communicatively coupled to the memory device and a second portion of the ECC circuit, the second switching device being adapted to select at least one of a signal from the memory device or a signal from the second portion of the ECC circuit, wherein the signal from the memory device and the signal from the second portion of the ECC circuit are related to at least one of the first input signal or the second input signal.

In yet another aspect of the invention, a computer readable storage device encoded with data that, when executed by a processor, performs a method, is provided. The method includes performing a first error test on a memory, the memory comprising an integrated error correcting code (ECC) portion, where the functionality of the ECC portion is bypassed during the first memory test and performing a second error test of the memory, where the second error test includes testing the functionality of the ECC portion.

In still another aspect of the invention, a computer readable storage device encoded with data that, when implemented in a manufacturing facility, adapts the manufacturing facility to create an apparatus, is provided The apparatus includes a memory device and an error correcting code (ECC) circuit communicatively coupled to the memory device. The apparatus also includes a first switching device communicatively coupled to the memory device and a first portion of the ECC circuit, the first switching device being adapted to select at least one of a first input signal or a second input signal. The apparatus also includes a second switching device communicatively coupled to the memory device and a second portion of the ECC circuit, the second switching device being adapted to select at least one of a signal from the memory device or a signal from the second portion of the ECC circuit, wherein the signal from the memory device and the signal from the second portion of the ECC circuit are related to at least one of the first input signal or the second input signal.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1:
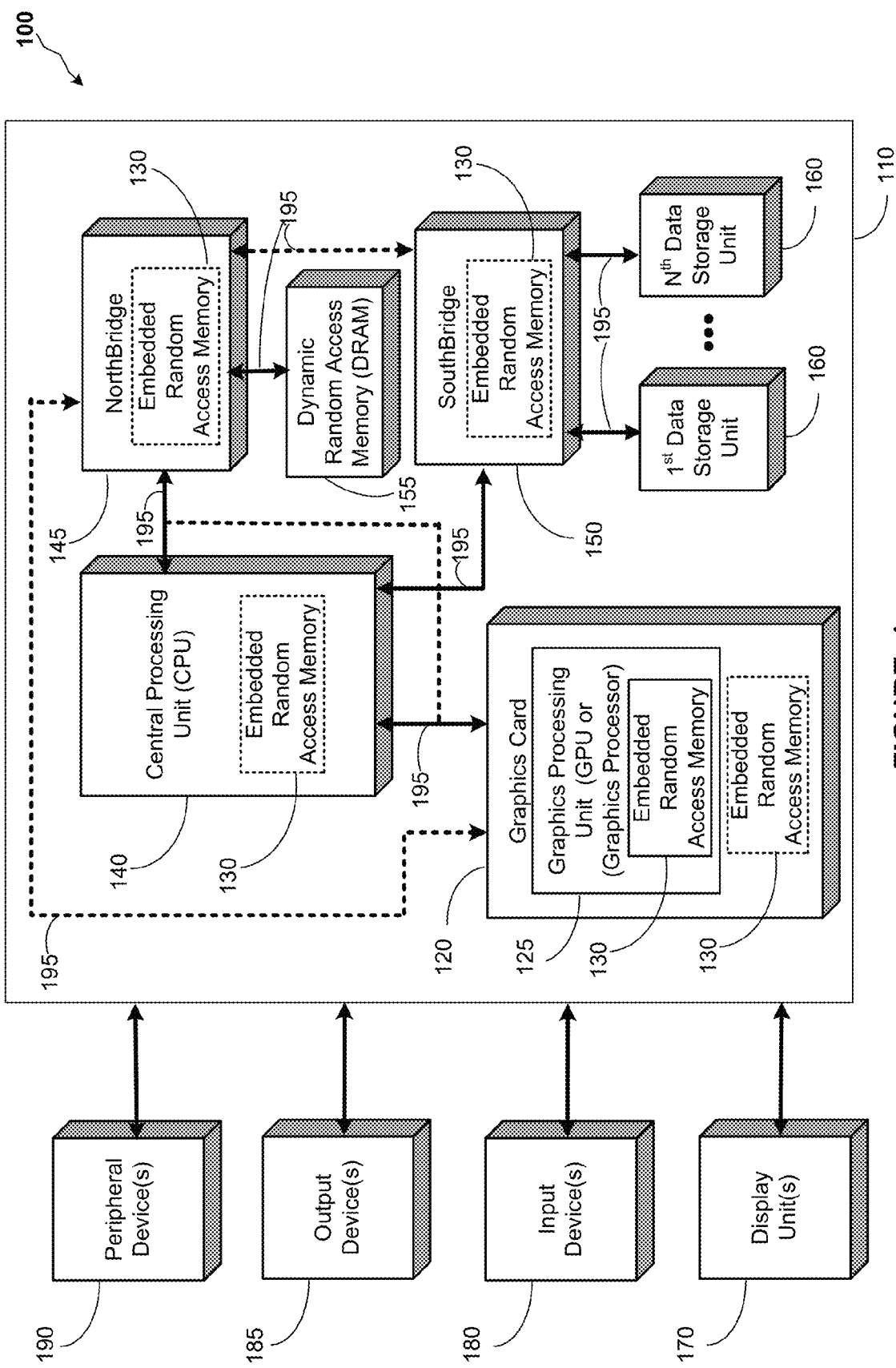
FIG. 1 schematically illustrates a simplified block diagram of a computer system including one or more embedded RAMs, according to one embodiment.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

Embodiments of the present invention will now be described with reference to the attached figures. Various structures, connections, systems and devices are schematically depicted in the drawings for purposes of explanation only and so as to not obscure the disclosed subject matter with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In the context of the embodiments described herein, storage elements such as flip-flops, registers, and bitcells are discussed. It is contemplated that various storage elements such as these, or others not specifically listed, may be used in conjunction with the described embodiments, even for cases in which a specific kind of storage element is illustratively used (e.g., when describing one of the FIGS. 1-8).

In the context of the embodiments described herein, a "dataword" may refer to a number of data bits transmitted together on a bus. A dataword may be any number of bits as specified by a designer or by various industry standards.

Embodiments described herein generally provide for test coverage of integrated ECC logic in embedded memories (e.g., RAMs, SRAMs, DRAMs, and/or the like). It is contemplated that various embodiments described herein are not mutually exclusive. That is, the various embodiments described herein may be implemented simultaneously with, or independently of, each other, as would be apparent to one of ordinary skill in the art having the benefit of this disclosure. It is also contemplated that embodiments herein are not limited exclusively to embedded memories, but may be implemented in non-embedded memories or other circuits as would be apparent to one of ordinary skill in the art having the benefit of this disclosure.

High-density embedded memories (e.g., high-density register files in 20 nm technologies and beyond) may integrate ECC encode/decode logic directly into the embedded memory peripheral logic. Doing this may both save area and reduce the impact on memory cycle time. Because the ECC logic may be integrated into the embedded memory itself, the complexity of testing it via traditional ATPG methods increases. Using ATPG for testing the ECC encode/decode logic (which may comprise deep-XOR trees) amounts to adding additional logic (flops and/or muxes) in the read and write data paths just for the purposes of enabling ATPG testing. This may cause an area bloat in the implementation of the embedded memory. There may also be issues of increased test-time to test embedded ECC logic when ATPG methods are used.

Memory devices may be subject to different kinds of errors. Soft errors are errors associated with an undesired change in data in a memory that is not caused by a physical defect in the memory. Hard errors, on the other hand, are errors associated with physical and/or structural defects or damage to the memory device. With the inclusion of ECC in memories, memories may be made fault tolerant. That is, errors in a data-word may be detected and/or corrected by using extra check bits that form part of the data-word. Adding ECC to memories increases the logical complexity, area and power of memories and a judicious choice needs to be made on the kind of ECC to be implemented in order to satisfy reliability requirements of memories. Most memory systems use a class of codes that support Single-Error-Correction and Double-Error-Detection (SEC-DED) in a code word. The use of ECC bits to detect and/or correct soft errors may greatly reduce the soft error rate (SER) in embedded memories such as SRAMs. However, efficiently and properly testing embedded ECC logic, as shown by the various embodiments described herein, may require a double-staged memory testing procedure in order to prevent the masking of hard errors by the ECC logic. Accordingly, as shown in various embodiments herein, a memory comprising embedded ECC logic may be tested in two parts using a first test and a second test on the memory. In one embodiment, a first memory test may be performed on the memory to determine if any hard errors exist in the memory (e.g., in a bitcell array in the memory). If it is determined that no physical errors are present in the memory (or if the errors are corrected/repaired), a second memory test may be performed on the memory to test the embedded ECC logic.

Turning now to FIG. 1, a block diagram of an exemplary computer system 100, in accordance with an embodiment of the present invention, is illustrated. In various embodiments the computer system 100 may be a personal computer, a notebook or tablet computer, a handheld computer, a mobile device, a telephone, a personal data assistant (PDA), a server, a mainframe, a work terminal, or the like. The computer system includes a main structure 110 which may be a computer motherboard, circuit board or printed circuit board, a desktop computer enclosure and/or tower, a laptop computer base, a server enclosure, part of a mobile device, personal data assistant (PDA), or the like. In one embodiment, the main structure 110 includes a graphics card 120. In one embodiment, the graphics card 120 may be a Radeon™ graphics card from Advanced Micro Devices ("AMD") or any other graphics card using memory, in alternate embodiments. The graphics card 120 may, in different embodiments, be connected on a Peripheral Component Interconnect (PCI) Bus (not shown), PCI-Express Bus (not shown) an Accelerated Graphics Port (AGP) Bus (also not shown), or any other connection known in the art. It should be noted that embodiments of the present invention are not limited by the connectivity of the graphics card 120 to the main computer structure 110. In one embodiment, computer runs an operating system such as Linux, Unix, Windows, Mac OS, or the like.

In one embodiment, the graphics card 120 may contain a graphics processing unit (GPU) 125 used in processing graphics data. The GPU 125, in one embodiment, may include an embedded memory 130. In one embodiment, the embedded memory 130 may be an embedded random access memory (RAM), an embedded static random access memory (SRAM), or an embedded dynamic random access memory (DRAM). In one or more embodiments, the embedded memory 130 may be an embedded RAM (e.g., an SRAM) with embedded ECC logic. In alternate embodiments, the embedded memory 130 may be embedded in the graphics card 120 in addition to, or instead of, being embedded in the GPU 125. In various embodiments the graphics card 120 may be referred to as a circuit board or a printed circuit board or a daughter card or the like. It should be noted that in any or all of the embodiments described herein, some or all of the ECC logic embedded (or otherwise used) in a memory device and/or structure may be part of the same silicon substrate as the memory, as one or more parts of the memory, or as any or all of any associated control logic.

In one embodiment, the computer system 100 includes a central processing unit (CPU) 140, which is connected to a northbridge 145. The CPU 140 and northbridge 145 may be housed on the motherboard (not shown) or some other structure of the computer system 100. It is contemplated that in certain embodiments, the graphics card 120 may be coupled to the CPU 140 via the northbridge 145 or some other connection as is known in the art. For example, CPU 140, northbridge 145, GPU 125 may be included in a single package or as part of a single die or "chips". Alternative embodiments which alter the arrangement of various components illustrated as forming part of main structure 110 are also contemplated. The CPU 140 and/or the northbridge 145, in certain embodiments, may each include an embedded memory 130 in addition to other embedded memories 130 found elsewhere in the computer system 100. In certain embodiments, the northbridge 145 may be coupled to a system RAM (or DRAM) 155; in other embodiments, the system RAM 155 may be coupled directly to the CPU 140. The system RAM 155 may be of any RAM type known in the art; the type of RAM 155 does not limit the embodiments of the present invention. In one embodiment, the northbridge 145 may be connected to a southbridge 150. In other embodiments, the northbridge 145 and southbridge 150 may be on the same chip in the computer system 100, or the northbridge 145 and southbridge 150 may be on different chips. In one embodiment, the southbridge 150 may have an embedded memory 130, in addition to any other embedded memories 130 elsewhere in the computer system 100. In various embodiments, the southbridge 150 may be connected to one or more data storage units 160. The data storage units 160 may be hard drives, solid state drives, magnetic tape, or any other writable media used for storing data. In various embodiments, the central processing unit 140, northbridge 145, southbridge 150, graphics processing unit 125, DRAM 155 and/or embedded RAM 130 may be a computer chip and/or a silicon-based computer chip, or may be part of a computer chip and/or a silicon-based computer chip. In one or more embodiments, the various components of the computer system 100 may be operatively, electrically and/or physically connected or linked with a bus 195 or more than one bus 195.

In different embodiments, the computer system 100 may be connected to one or more display units 170, input devices 180, output devices 185 and/or other peripheral devices 190. It is contemplated that in various embodiments, these elements may be internal or external to the computer system 100, and may be wired or wirelessly connected, without affecting the scope of the embodiments of the present invention. The display units 170 may be internal or external monitors, television screens, handheld device displays, and the like. The input devices 180 may be any one of a keyboard, mouse, track-ball, stylus, mouse pad, mouse button, joystick, scanner or the like. The output devices 185 may be any one of a monitor, printer, plotter, copier or other output device. The peripheral devices 190 may be any other device which can be coupled to a computer: a CD/DVD drive capable of reading and/or writing to physical digital media, a USB device, Zip Drive, external floppy drive, external hard drive, phone and/or broadband modem, router/gateway, access point and/or the like. To the extent certain exemplary aspects of the computer system 100 are not described herein, such exemplary aspects may or may not be included in various embodiments without limiting the spirit and scope of the embodiments of the present invention as would be understood by one of skill in the art.

Figure 2:
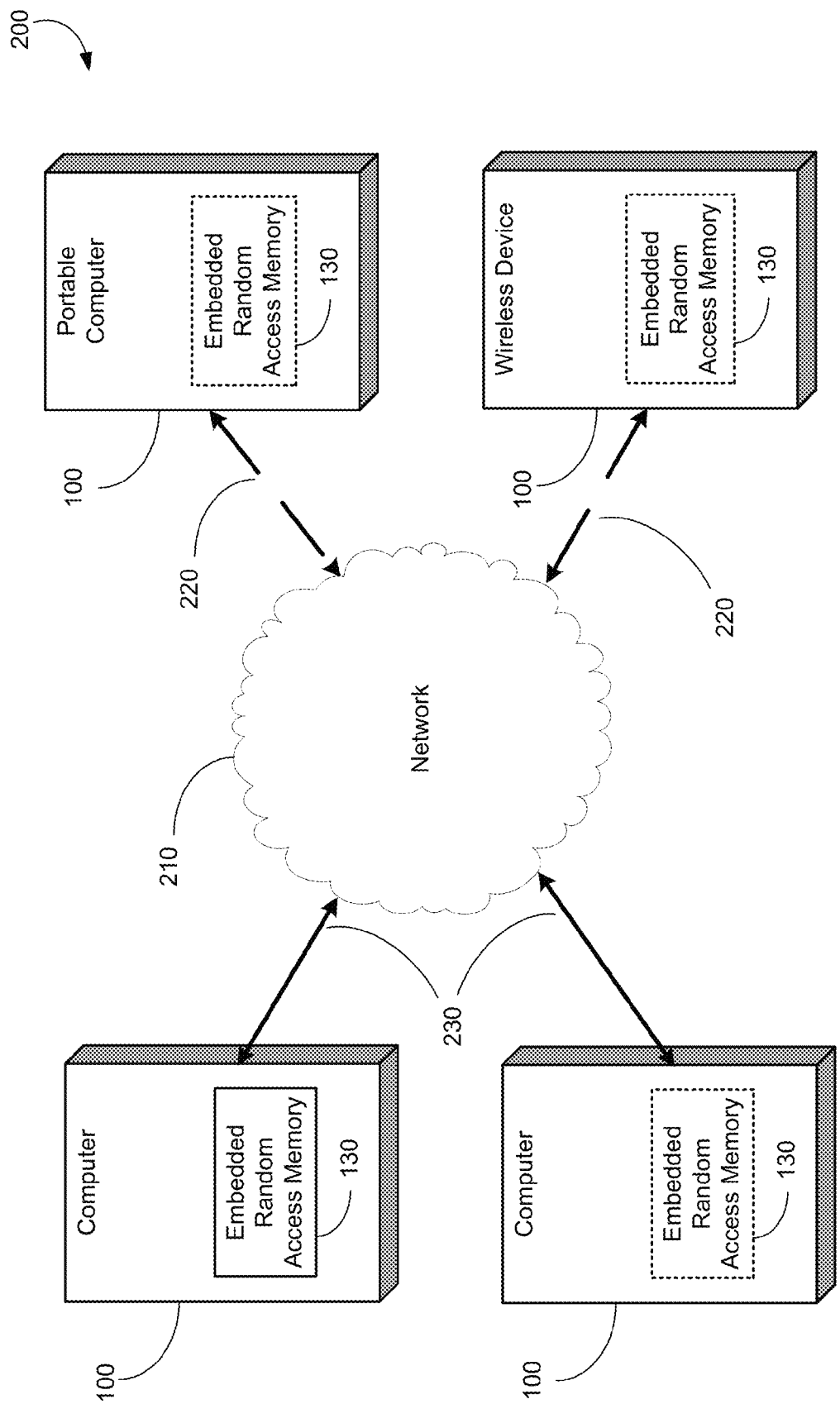
FIG. 2 shows a simplified block diagram of a multiple computer system connected via a network, according to one embodiment.

Turning now to FIG. 2, a block diagram of an exemplary computer network 200, in accordance with an embodiment of the present invention, is illustrated. In one embodiment, any number of computer systems 100 may be communicatively coupled and/or connected to each other through a network infrastructure 210. In various embodiments, such connections may be wired 230 or wireless 220 without limiting the scope of the embodiments described herein. The network 200 may be a local area network (LAN), wide area network (WAN), personal network, company intranet or company network, the Internet, or the like. In one embodiment, the computer systems 100 connected to the network 200 via network infrastructure 210 may be a personal computer, a laptop computer, a handheld computer, a mobile device, a telephone, a personal data assistant (PDA), a server, a mainframe, a work terminal, or the like. The number of computers depicted in FIG. 2 is exemplary in nature; in practice any number of computer systems 100 maybe coupled/connected using the network 200.

Figure 3:
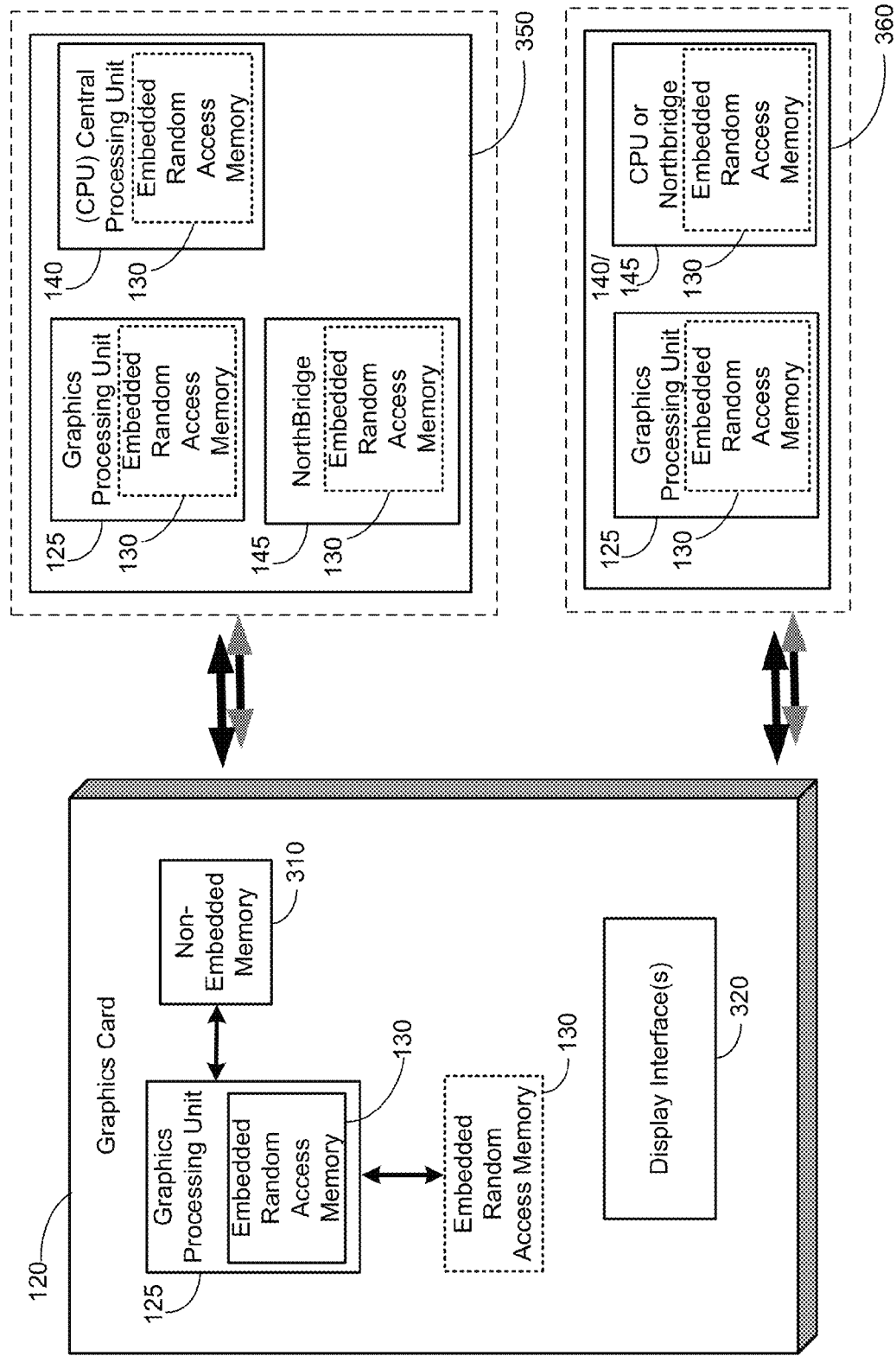
FIG. 3 provides a more detailed representation of one embodiment of a graphics card in the computer system provided in FIG. 1.
Figure 4:
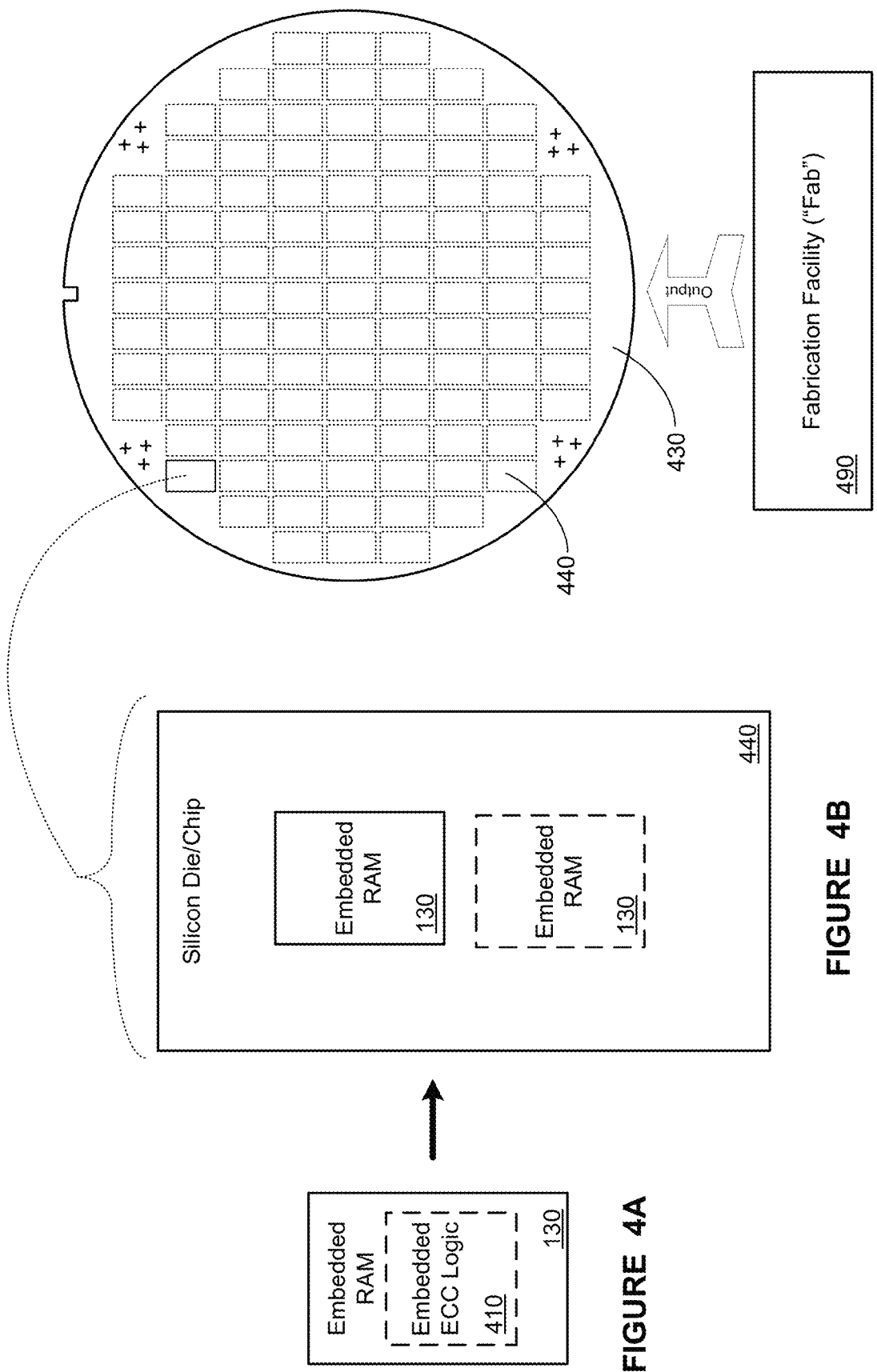
FIG. 4 illustrates an exemplary detailed representation of an embedded memory that is provided in FIGS. 1-3 according to one embodiment.

Turning now to FIG. 3, a block diagram of an exemplary graphics card 120, in accordance with an embodiment of the present invention, is illustrated. In one embodiment, the graphics card 120 may contain a graphics processing unit (GPU) 125 used in processing graphics data. The GPU 125, in one embodiment as shown, may include an embedded memory 130. In one embodiment, the embedded memory 130 may be an embedded static random access memory (SRAM). In one or more embodiments, the embedded memory 130 may include embedded ECC logic. In alternate embodiments, the embedded memory 130 may be embedded in the graphics card 120 in addition to, or instead of, being embedded in the GPU 125. In another embodiment, the graphics card 120 may include a non-embedded memory 310, for example a dynamic RAM (DRAM) in addition to any embedded memories 130. The graphics card 120 may also include one or more display interfaces 320. To the extent certain exemplary aspects of the graphics card 120 are not described herein, such exemplary aspects may or may not be included in various embodiments without limiting the spirit and scope of the embodiments of the present invention as would be understood by one of skill in the art.

Referring still to FIG. 3, in one embodiment, the graphics processing unit 125 and embedded memory 130 may reside on the same silicon chip 350 as the CPU 140 and northbridge 145. In one alternate embodiment, the graphics processing unit 125 and embedded memory 130 may reside on the same silicon chip 360 as the CPU 140. In such embodiments, the silicon chip(s) 350/360 may be used in a computer system 100 in place of, or in addition to, the graphics card 120. The silicon chip(s) 350/360 may be housed on the motherboard (not shown) or other structure of the computer system 100.

Turning now to FIG. 4A, a simplified, exemplary representation of the embedded memory 130, and, according to one or more embodiments, an embedded ECC logic circuit 410, which may be used in silicon die/chips 440, as well as devices depicted in FIGS. 1-3, according to one embodiment is illustrated. However, those skilled in the art will appreciate that the embedded memory 130 may take on any of a variety of forms, including those previously described above, without departing from the spirit and scope of the instant invention. The embedded memory 130 may be implemented as single elements (130) or in arrays or in other groups (not shown).

Turning to FIG. 4B, the silicon die/chip 440 is illustrated as one or more embedded RAMs 130, or any other configuration of embedded RAMs 130 (with and/or without embedded ECC logic 410) as would be apparent to one of skill in the art having the benefit of this disclosure. As discussed above, various embodiments of embedded RAMs 130 may be used in a wide variety of electronic devices, including, but not limited to, central and graphics processors, motherboards, graphics cards, combinatorial logic implementations, register banks, memory, other integrated circuits (ICs), or the like.

Turning now to FIG. 4C, in accordance with one embodiment, and as described above, one or more of the embedded RAMs 130 may be included on the silicon die/chips 440 (or computer chip). The silicon die/chips 440 may contain one or more different configurations of the embedded RAMs 130 (e.g., one or more SRAMs with embedded ECC logic circuits 410). The silicon chips 440 may be produced on a silicon wafer 430 in a fabrication facility (or "fab") 490. That is, the silicon wafers 430 and the silicon die/chips 440 may be referred to as the output, or product of, the fab 490. The silicon die/chips 440 may be used in electronic devices, such as those described above in this disclosure.

Figure 5:
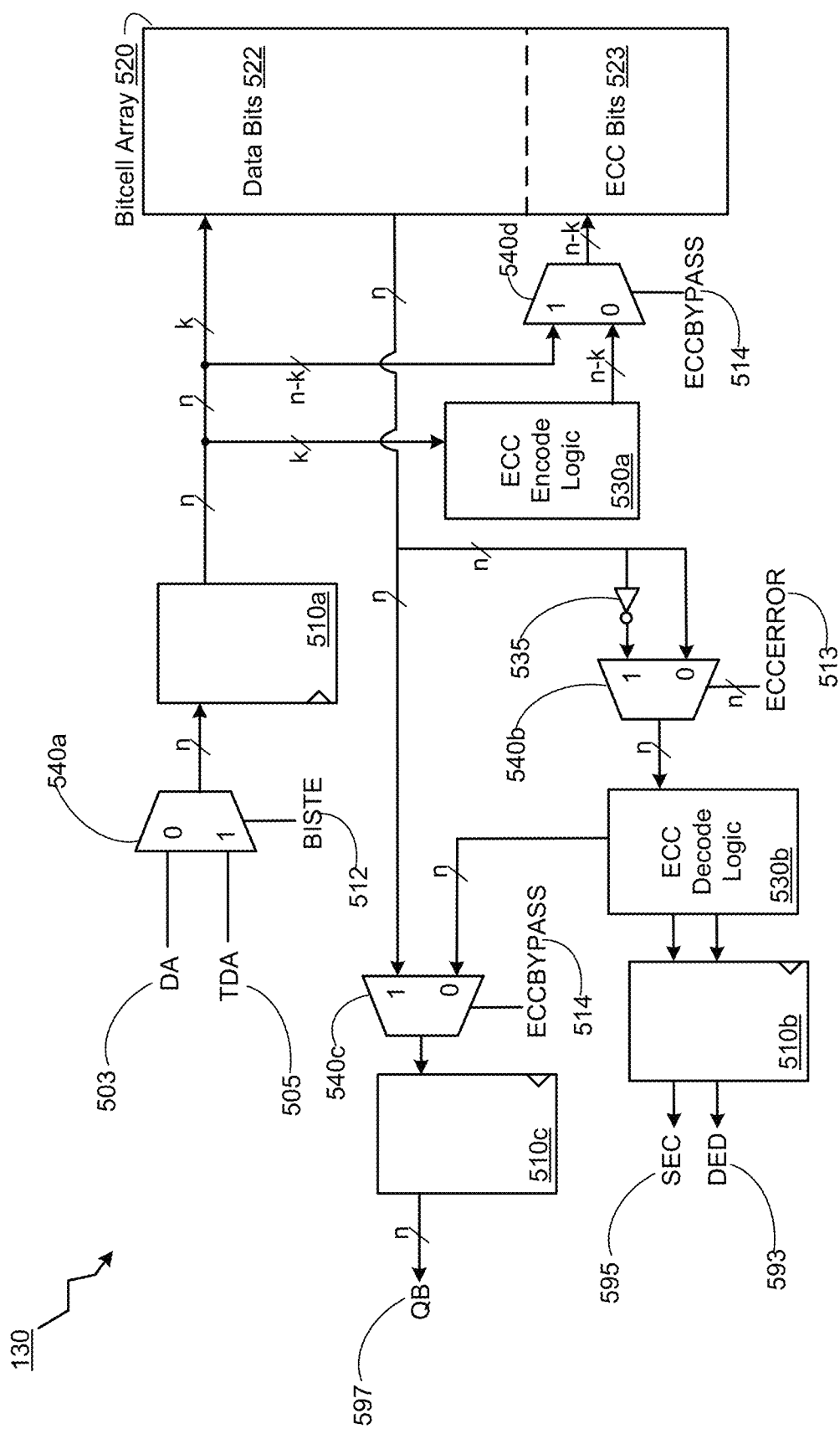
FIG. 5 illustrates a schematic diagram of a portion of an embedded memory, according to one exemplary embodiment.

Turning now to FIG. 5, a diagram of an exemplary implementation of a portion of the embedded memory 130 is illustrated, according to one embodiment. In one embodiment, the embedded memory 130 may contain embedded ECC logic 530. As shown in FIG. 5, the embedded ECC logic 530 may be implemented in one or more portions (e.g., an ECC encode logic portion 530a and an ECC decode logic portion 530b). It should be noted that in various embodiments, the embedded ECC logic 530 may be implemented in a single portion, and for purposes of illustration and conceptualization, any configuration and/or partitioning of the embedded ECC logic may be used in accordance with the embodiments herein. The embedded memory 130 may have a data input DA 503 and a test data input TDA 505, each of which may be an n-bit bus, where n is the number of bits in a dataword to be written into a memory; alternatively, the DA 503 and/or the TDA 505 may be a bus adapted to transmit an n-bit dataword. The DA 503 and the TDA 505 may be connected to the inputs of a switch 540a. The output of the switch 540a may be input into a register or flip-flop 510a. The DA 503 and/or the TDA 505 may be selected as an output of the switch 540a by a switch select signal BISTE 512. In other words, the BISTE 512 may be asserted (e.g., a logical 1) or de-asserted (e.g., a logical 0) in order to select between the DA 503 and the TDA 505 inputs. It should be noted that in various embodiments the DA 503 or the TDA 505 may be selected via either an asserted or de-asserted BISTE 512 respectively.

The embedded memory 130 may include a bitcell array 520. While FIG. 5 is described in terms of the bitcell array 520, it is contemplated that other memory structures not shown may also be used. The bitcell array 520 may include a data bits portion 522 adapted to store data bits (e.g., data input on DA 503 and/or test data input on TDA 505). The bitcell array 520 may also include an ECC bits portion 523 adapted to store ECC bits (e.g., data calculated based upon input data and/or test data). In one embodiment, the DA 503 may act as a traditional memory data input and allow data to be written into the embedded memory 130, for example, by storing input data in the bitcell array 520 from the output of the register/flip-flop 510a. In one embodiment, the TDA 505 may allow test data to be written into the embedded memory 130, for example, by storing the test data in the bitcell array 520 from the output of the register/flip-flop 510a. The test data may be stored in the bitcell array during a test of the embedded memory 130. The test data may also be modified and/or used in various calculations/determinations (e.g., using the ECC encode logic 530a), and modifications and/or data calculated/determined based upon the test data may also be written into the bitcell array 520.

In one embodiment, the ECC encode logic 530a may be adapted to encode incoming input data from the DA 503 or incoming input test data from the TDA 505 to generate/determine error correction code (ECC) bits which may eventually be stored in the ECC bits portion 523 of the bitcell array 520. That is, a switch 540d may take the output of the ECC encode logic 530a and a portion of the n-bit dataword from the DA 503 and/or the TDA 505, and may output either input to the bitcell array 520 based upon a switch select signal ECCBYPASS 514. The ECCBYPASS 514 may be asserted (e.g., a logical 1) or de-asserted (e.g., a logical 0) in order to select between inputs of the switch 540d. It should be noted that in various embodiments the inputs of the switch 540d may be selected via either an asserted or de-asserted ECCBYPASS 514 respectively. In one embodiment, n–k bits ("n minus k bits") from the DA 503 and/or the TDA 505 may be written into the bitcell array 520 when the ECC logic (e.g., the ECC encode logic 530a and/or the ECC decode logic 530b) functionality is to be bypassed in order to test the memory and/or bitcell array 520 for hard errors. The n–k bits from the DA 503 and/or the TDA 505 may be representative of ECC bits in the n-bit dataword, or may simply act as placeholders or dummy-bits in the n-bit dataword. In another embodiment, the output of the ECC encode logic 530a may be written into the bitcell array 520 when the ECC functionality is to be used and/or tested.

The ECC encode logic 530a may take k bits of data as an input, where k bits may be a subset of the n bits of the DA 503 and/or the TDA 505. The ECC encode logic 530a may output n–k bits of ECC data (i.e., of ECC bits). The generated/determined ECC bits may be later decoded (e.g., using the ECC decode logic 530b) in order to detect and/or correct soft errors in the memory.

In one embodiment, the bitcell array 520 may output some or all of the stored data in the bitcell array 520 from the data bits section 522 and/or the ECC bits section 523 to the input of a switch 540c. The switch 540c may include a switch select signal ECCBYPASS 514. The ECCBYPASS 514 may be asserted (e.g., a logical 1) or de-asserted (e.g., a logical 0) in order to select between inputs to the switch 540c. It should be noted that in various embodiments the inputs to the switch 540c may be selected via either an asserted or de-asserted ECCBYPASS 514 respectively. The switch 540c may have its output connected to the input of a register/flip-flop 510c having an output QB 597.

In various embodiments, the bitcell array 520 may output some or all of the stored data in the bitcell array 520 from the data bits section 522 and/or the ECC bits section 523 to a switch 540b. One input of the switch 540b may take unaltered data output from the bitcell array 520. Another input of the switch 540b may take altered data output from the bitcell array 520, where the data may be altered by inverting one or more bits of the data (e.g., using an inverter 535). The inverter 535 may have its input connected to the bitcell array 520 and its output connected to an input of the switch 540b (i.e., the input of the switch 540b may take altered data output from the bitcell array 520 via the inverter 535), thus the inverter 535 may act as an error injecting mechanism by flipping one or more bits of the data output from the bitcell array 520 and simulating an error in the data. A single error may be injected into a stream of data, or more than one error may be injected. In one embodiment, the bitcell array 520 and embedded ECC logic 530 may be tested multiple times; for example, multiple tests including shifting in an error bit to different positions within the data stream during consecutive (or non-consecutive) tests may be performed. The switch 540b may select between data from the bitcell array 520 and data from the bitcell array that contains one or more injected errors. In other words, by selecting the data from the bitcell array 520 with an injected error, the functionality of the embedded ECC logic 530 itself may be tested. During normal mode of operation of memory 130, no errors are injected. The switch 540b may include a switch select signal ECCERROR 513. The ECCERROR 513 may be a bussed signal. The bits of the ECCERROR 513 may be asserted (e.g., a logical 1) or de-asserted (e.g., a logical 0) in order to select between inputs to the switch 540b. It should be noted that in various embodiments the inputs to the switch 540b may be selected via either an asserted or de-asserted ECCERROR 513 respectively. It should be noted that the ECCERROR 513 may be, in one or more embodiments, a bussed signal that may be n bits wide. Each or any combination of bits of the n-bit data read from the bitcell array 520 may be flipped and be in error. The ECCERROR 513 may be the output of a scannable flop-chain (e.g., a chain of flip-flops) that is controllable and/or selectable during the testing of the embedded memory 130. In other words, while testing the embedded memory 130, any number of errors may be injected into the test data at any location within the data. With respect to the switch 540b, the ECCERROR bits provided may be a bussed signal ECCERROR[n−1:0].

In accordance with one embodiment, and as depicted in FIG. 5, the switch 540b may be located on the "read side" (i.e., in the read path) of the of the bitcell array 520. That is, errors may be injected into the data after the data is read from the bitcell array 520. In other embodiments, and as described below with respect to FIG. 6, errors may be injected into the data on the "write side" of the bitcell array 520 (i.e., before the data is written into the bitcell array 520.

In one embodiment, the output of the switch 540b may be connected to an input of the ECC decode logic 530b. The ECC decode logic 530b may be adapted to decode the ECC bits stored in the ECC bits section 523 of the bitcell array 520 in order to determine whether any errors are present in the data stored in the data bits section 522 and/or the ECC bits section 523 of the bitcell array 520. One example of an error detected by the ECC decode logic 530b is a soft error such as those caused by cosmic rays or flipped bits in the bitcell array 520. If an error (e.g., a soft error) is detected, the ECC decode logic 530b may output a signal(s) to the input of a register/flip-flop 510b, which may in turn output the signal(s) to a single-error correcting (SEC) logic via path 595 if a single error is detected and/or to a double error-detecting (DED) logic via path 593 if a double error is detected. The single-error correcting (SEC) logic and double error-detecting (DED) logic, as is known in the art, may correct the detected errors and/or check for additional errors. The ECC decode logic 530b may also have its output connected to the switch 540c. Using the switch select signal ECCBYPASS 514, the switch 540c may select between data output from the ECC decode logic 530b and data output from the bitcell array 520 which did not go through the ECC decode logic 530b. The bypassed data output is typically used to detect hard errors in the bitcell array 520 and replace the faulty cells by redundant cells if the bitcell array 520 implementation allows it.

Figure 6:
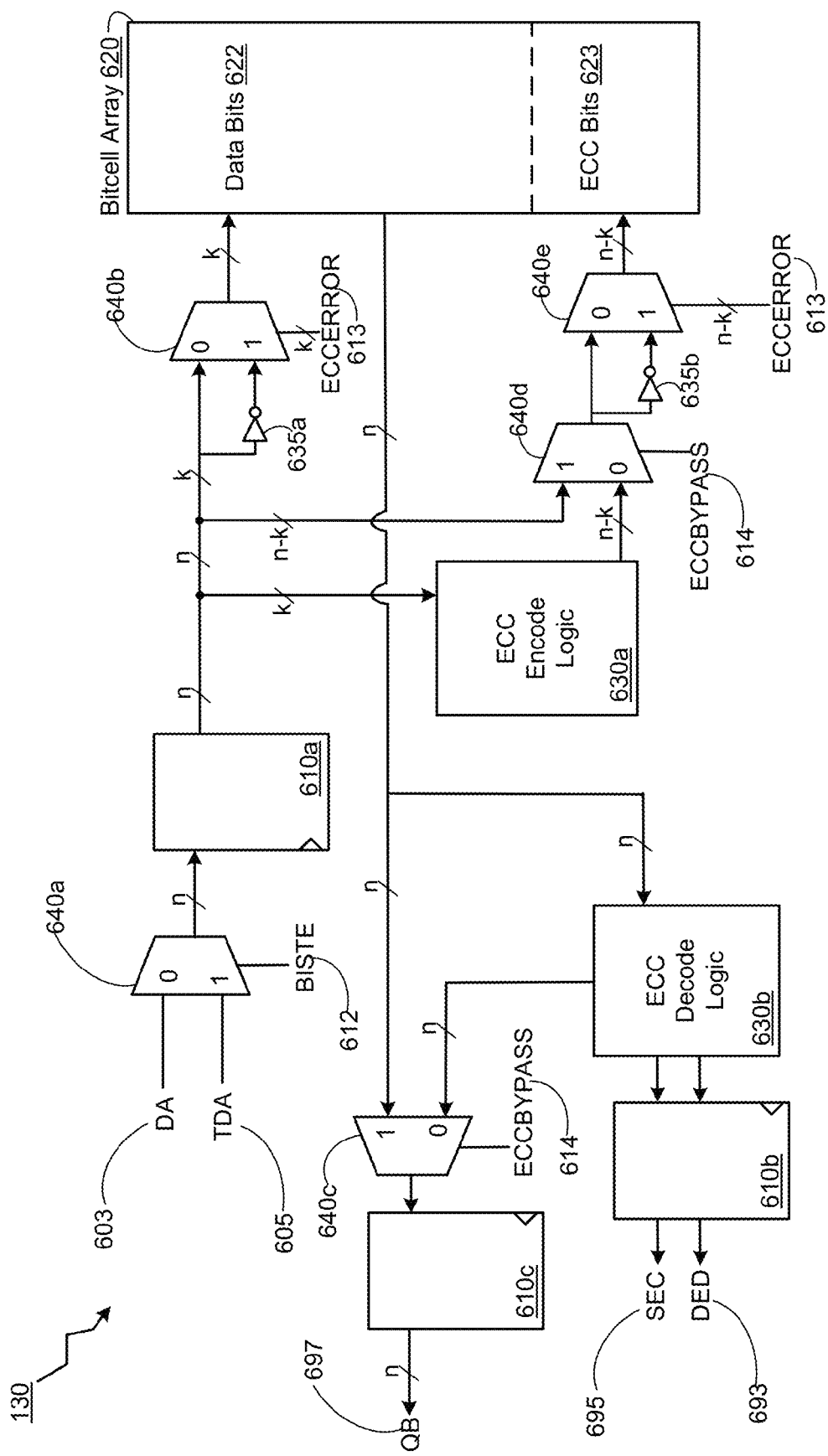
FIG. 6 illustrates a schematic diagram of a portion of an embedded memory, according to one exemplary embodiment.

Turning now to FIG. 6, a diagram of an exemplary implementation of a portion of the embedded memory 130 is illustrated, according to one embodiment. FIG. 6 shows an alternate configuration to that shown in FIG. 5. In one embodiment, the embedded memory 130 may contain embedded ECC logic 630. As shown in FIG. 6, the embedded ECC logic 630 may be implemented in one or more portions (e.g., an ECC encode logic portion 630a and an ECC decode logic portion 630b). It should be noted that in various embodiments, the embedded ECC logic 630 may be implemented in a single portion, and for purposes of illustration and conceptualization, any configuration and/or partitioning of the embedded ECC logic may be used in accordance with the embodiments herein. The embedded memory 130 may have a data input DA 603 and a test data input TDA 605, each of which may be an n-bit bus, where n is the number of bits in a dataword to be written into a memory; alternatively, the DA 603 and/or the TDA 605 may be a bus adapted to transmit an n-bit dataword. The DA 603 and the TDA 605 may be connected to the inputs of a switch 640a. The output of the switch 640a may be input into a register or flip-flop 610a. The DA 603 and/or the TDA 605 may be selected as an output of the switch 640a by a switch select signal BISTE 612. In other words, the BISTE 612 may be asserted (e.g., a logical 1) or de-asserted (e.g., a logical 0) in order to select between the DA 603 and the TDA 605 inputs. It should be noted that in various embodiments the DA 603 or the TDA 605 may be selected via either an asserted or de-asserted BISTE 612 respectively.

The embedded memory 130 may include a switch 640b. The switch 640b may take the output of the register/flip-flop 610a as an input. The switch may take an inverted output of the register/flip-flop 610a as an input. The output of the register/flip-flop 610a may be inverted using an inverter 635a, for example, as shown in FIG. 6. The inverter 635a may provide its output to the switch 640b. The switch 640b may include a switch select signal ECCERROR 613. The ECCERROR 613 may be a bussed signal. The bits of the ECCERROR 613 may be asserted (e.g., a logical 1) or de-asserted (e.g., a logical 0) in order to select between inputs to the switch 640b. It should be noted that in various embodiments the inputs to the switch 640b may be selected via either an asserted or de-asserted ECCERROR 613 respectively. It should be noted that the ECCERROR 613 may be, in one or more embodiments, a bussed signal that may be n bits wide. Each or any combination of bits of the n-bit data read from the bitcell array 620 may be flipped and be in error. The ECCERROR 613 may be the output of a scannable flop-chain (e.g., a chain of flip-flops) that is controllable and/or selectable during the testing of the embedded memory 130. In other words, while testing the embedded memory 130, any number of errors may be injected into the test data at any location within the data. With respect to the switches 640b and 640e, the ECCERROR bits provided maybe ECCERROR[n−1:0], ECCERROR[k−1:0] control switch 640b, and ECCERROR[n−k−1:0] control switch 640e.

The embedded memory 130 may include a bitcell array 620. While FIG. 6 is described in terms of the bitcell array 620, it is contemplated that other memory structures not shown may also be used. The bitcell array 620 may include a data bits portion 622 adapted to store data bits (e.g., data input on DA 603 and/or test data input on TDA 605). The bitcell array 620 may also include an ECC bits portion 623 adapted to store ECC bits (e.g., data calculated based upon input data and/or test data). In one embodiment, the DA 603 may act as a traditional memory data input and allow data to be written into the embedded memory 130, for example, by storing input data in the bitcell array 620 from the output of the switch 640b. In one embodiment, the TDA 605 may allow test data to be written into the embedded memory 130, for example, by storing the test data in the bitcell array 620 from the output of the switch 640b. The test data may be stored in the bitcell array during a test of the embedded memory 130. The test data may also be modified and/or used in various calculations/determinations (e.g., using the ECC encode logic 630a), and modifications and/or data calculated/determined based upon the test data may also be written into the bitcell array 620.

In one embodiment, the ECC encode logic 630a may be adapted to encode incoming input data from the DA 603 or incoming input test data from the TDA 605 to generate/determine error correction code (ECC) bits which may eventually be stored in the ECC bits portion 623 of the bitcell array 620. The ECC encode logic 630a may take k-bits of data as an input, where k bits may be a subset of the n bits of the DA 603 and/or the TDA 605. The ECC encode logic 630a may output n−k bits ("n minus k bits") of ECC data (i.e., of ECC bits). The generated/determined ECC bits may be later decoded (e.g., using the ECC decode logic 630b) in order to detect and/or correct soft errors in the memory. A switch 640d may take the output of the ECC encode logic 630a and a portion of the n-bit dataword (e.g., n−k bits) from the DA 603 and/or the TDA 605 as inputs, and may output either input signal to the bitcell array 620 based upon a switch select signal ECCBYPASS 614. The ECCBYPASS 614 may be asserted (e.g., a logical 1) or de-asserted (e.g., a logical 0) in order to select between inputs of the switch 640d. It should be noted that in various embodiments the inputs of the switch 640d may be selected via either an asserted or de-asserted ECCBYPASS 614 respectively. In one embodiment, n−k bits from the DA 603 and/or the TDA 605 may be written into the bitcell array 620 when the ECC logic (e.g., the ECC encode logic 630a and/or the ECC decode logic 630b) functionality is to be bypassed in order to test the memory and/or bitcell array 620 for hard errors. The n−k bits from the DA 603 and/or the TDA 605 may be representative of ECC bits in the n-bit dataword, or may simply act as placeholders or dummy-bits in the n-bit dataword. In another embodiment, the output of the ECC encode logic 630a may be written into the bitcell array 620 when the ECC functionality is to be used and/or tested.

In one or more embodiments, the switch 640d may transmit its output to a switch 640e. One input of the switch 640e may take unaltered data output from the switch 640d. Another input of the switch 640e may take altered data output from the switch 640d, where the data may be altered by inverting one or more bits of the data (e.g., using an inverter 635b). The inverter 635b may have its input connected to the switch 640d and its output connected to an input of the switch 640e, and may act as an error injecting mechanism by flipping one or more bits of the data output from the switch 640d, thus simulating an error in the data. A single error may be injected into a stream of data, or more than one error may be injected. In one embodiment, the bitcell array 620 and embedded ECC logic 630 may be tested multiple times; for example, multiple tests including shifting in an error bit to different positions within the data stream during consecutive (or non-consecutive) tests may be performed. In one embodiment, the any number of error bits may be injected into the data bits and/or the ECC bits of a dataword during a test of the ECC functionality.

The switch 640e may select between data from the switch 640d that is unaltered and data from the switch 640d that contains one or more injected errors. In other words, by selecting the data from the switch 640d with an injected error, the functionality of the embedded ECC logic 630 itself may be tested. During normal mode of operation of the memory 130, no errors are injected. The switches 640b and 640e may include a switch select signal ECCERROR 613. It should be noted that the ECCERROR 613 may be, in one or more embodiments, a bussed signal that may be n bits wide. Each or any combination of bits of the n-bit data read from the bitcell array 620 may be flipped and be in error. The bits of the ECCERROR 613 signal may be asserted (e.g., a logical 1) or de-asserted (e.g., a logical 0) in order to select between inputs to the switch 640e. It should be noted that in various embodiments the inputs to the switch 640e may be selected via either an asserted or de-asserted ECCERROR 613 respectively. The ECCERROR 613 may be the output of a scannable flop-chain (e.g., a chain of flip-flops) that is controllable and/or selectable during the testing of the embedded memory 130. In other words, while testing the embedded memory 130, any number of errors may be injected into the test data at any location within the data. With respect to the switch 640b, the ECCERROR bits provided may be ECCERROR[k−1:0]; that is bits k−1 to 0 (bit k minus 1 to bit 0 (zero)). With respect to the switch 640e, the ECCERROR bits provided may be ECCERROR[n−1−k:0]; that is bits n−1−k to 0 (bit n minus 1 minus k to bit 0 (zero)).

In accordance with one embodiment, and as depicted in FIG. 6, the switch 640e may be located on the "write side" of the of the bitcell array 620. That is, errors may be injected into the data before the data is read from the bitcell array 620. In other embodiments, as described above with respect to FIG. 5, errors may be injected into the data on the "read side" of the bitcell array 620 (i.e., after the data is written into the bitcell array 620).

In one embodiment, the bitcell array 620 may output some or all of the stored data in the bitcell array 620 from the data bits section 622 and/or the ECC bits section 623 to the input of a switch 640c. One input of the switch 640c may take unaltered data output from the bitcell array 620. Another input of the switch 640c may take data output from the bitcell array 620, where the data may be first altered by sending it through the ECC decode logic 630b. The switch 640c may select between data from the bitcell array 620 (e.g., if the ECC functionality is bypassed) and data from the ECC decode logic 630b (e.g., if the ECC functionality is not bypassed). The switch 640c may include a switch select signal ECCBYPASS 614. The ECCBYPASS 614 may be asserted (e.g., a logical 1) or de-asserted (e.g., a logical 0) in order to select between inputs to the switch 640c. It should be noted that in various embodiments the inputs to the switch 640c may be selected via either an asserted or de-asserted ECCBYPASS 614 respectively. The switch 640c may have its output connected to the input of a register/flip-flop 610c having an output QB 697.

The ECC decode logic 630b may be adapted to decode the ECC bits stored in the ECC bits section 623 of the bitcell array 620 in order to determine whether any errors are present in the data stored in the data bits section 622 and/or the ECC bits section 623 of the bitcell array 620. One example of an error detected by the ECC decode logic 630b is a soft error such as those caused by cosmic rays or flipped bits in the bitcell array 620. If an error (e.g., a soft error) is detected, the ECC decode logic 630b may output a signal(s) to the input of a register/flip-flop 610b, which may in turn output the signal(s) to a single-error correcting (SEC) logic via path 695 if a single error is detected and/or to a double error-detecting (DED) logic via path 693 if a double error is detected. The single-error correcting (SEC) logic and double error-detecting (DED) logic, as is known in the art, may correct the detected errors and/or check for additional errors. The ECC decode logic 630b may also have its output connected to the switch 640c. Using the switch select signal ECCBYPASS 614, the switch 640c may select between data output from the ECC decode logic 630b and data output from the bitcell array 620 which did not go through the ECC decode logic 630b. The bypassed data output is typically used to detect hard errors in the bitcell array 620 and replace the faulty cells by redundant cells if the bitcell array 620 implementation allows it.

It should be noted that while similar in overall functionality, the embedded memory 130 configurations shown in FIGS. 5 and 6, may each provide for various timing benefits and benefits with respect to physical layout considerations such as, but not limited to, setup times, hold times, overall path timing and/or routing. Part of these timing benefits may be attributable to the placement of the error injecting inverters and switches. For example, by placing the error injecting inverters and switches on the "write" side of the memory, the "read" side path may have less logic to traverse during a given clock cycle. In cases where an ECC decode logic portion/circuit consumes most of a clock cycle, such a placement of the error injecting inverters and switches in the "write" path may be advantageous.

Figure 7:
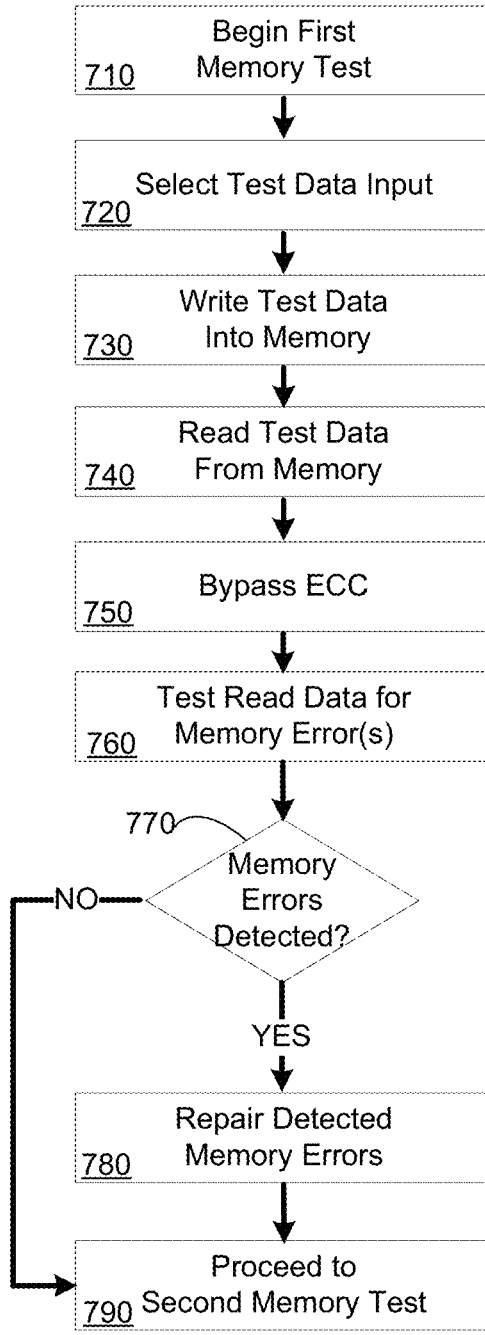
FIG. 7 illustrates a first error test flowchart for a memory, according to one embodiment.

Turning now to FIG. 7, in accordance with one or more embodiments, a flowchart depicting a first test for testing a memory is shown. At step 710, a first memory test may begin or be initiated. The first memory test may be designed to test a memory, bitcell array and/or register bank for errors such as hard errors. Hard errors may be defects in the structure and/or physical aspects of the memory and/or the like. A test data input may be selected (step 720). The selected test data input may comprise data that will be used to test the memory, bitcell array and/or register bank for errors. The test data may be data of any kind and/or format as would be known to those of ordinary skill in the art having the benefit of this disclosure. Once a test data input is selected, the test data on the test data input may be written into the memory (e.g., an SRAM) (step 730). Writing the test data into the memory may or may not include writing ECC data bits associated with the test data, in accordance with various embodiments, although it should be noted that ECC functionality may be bypassed during the first memory test. The ECC functionality may be bypassed, in one embodiment, by setting the ECCERROR 513 bits to zero and the ECCBYPASS 514 bit(s) to one, as described above with respect to FIGS. 5 and 6.

The test data may then be read from the memory (step 740) and any steps related to the ECC data bits may be bypassed (step 750). That is, the functionality of any ECC logic may, at this point, be bypassed. Any steps related to the ECC data bits may still be performed (e.g., step 750), but any results and/or determinations may be ignored or not acted upon. Bypassing the ECC functionality may, in one or more embodiments, be performed by selecting an input of a switch(es) (e.g., the switches 540c-d using the ECCBYPASS 514) in order to bypass any ECC functionality. The memory may then be tested for errors (step 760) by, for example, testing/analyzing the test data read from the memory. If no memory errors are detected (step 770), the flow may proceed to the second memory test (step 790). If a memory error is detected (step 770), the flow may proceed and repair and/or correct the detected memory errors (step 780). It should be noted that while not explicitly illustrated in FIG. 7, the detection and repair of detected memory errors may occur one or more times. That is, the repair of memory errors detected during the first memory test may continue until all or substantially all (e.g., 90%, 95% or 99%) of the memory errors are detected and/or repaired. Once memory errors are repaired/corrected, the flow may proceed to the second memory test (at step 790 to step 810 (FIG. 8, below)).

It should be noted that while the bypassing of ECC functionality is shown at step 750, the ECCERROR 513 bits and the ECCBYPASS 514 bit(s) as shown above, for example, may be set accordingly at any time in the test flow prior to when a dataword reaches the respective switch(es).

Figure 8:
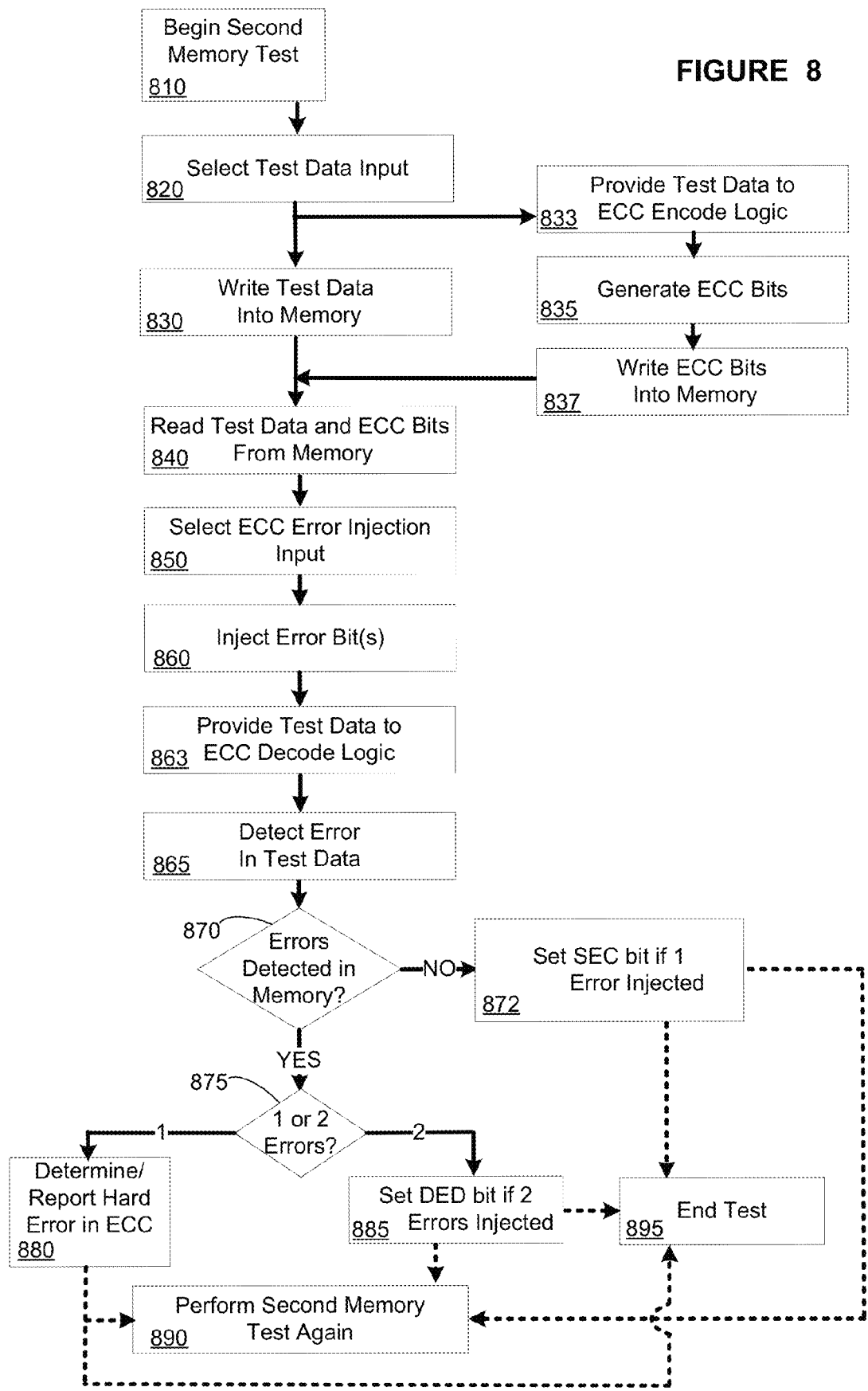
FIG. 8 illustrates a second error test flowchart for a memory, according to one embodiment.

Turning now to FIG. 8, in accordance with one or more embodiments, a flowchart depicting a second test for testing a memory is shown. At step 810, a second memory test may begin or be initiated. The second memory test may be designed to test embedded or non-embedded ECC logic associated with a memory, bitcell array and/or register bank. The second memory test may, in one embodiment, test the associated ECC logic by simulating one or more soft errors in a memory or its associated data (e.g., a flipped bit in a dataword read from a memory, bitcell array and/or register bank). Soft errors may occur due to cosmic rays, flipping of bits in the memory and/or the like. The ECC functionality may be enabled, in one embodiment for example, and as shown above, by setting the ECCBYPASS 514 bit(s) to zero, as described above with respect to FIG. 5. Likewise, errors may be injected into test data (ECC data and/or non-ECC data) by setting one or more of the ECCERROR 513 bits to one. An ECCERROR 513 bit set to one simulates an error for a bit corresponding to that position in a dataword. It should be noted that while the ECCERROR 513 bits are shown as being selected in step 850 (below) and the ECCBYPASS 514 bit(s) as shown as being selected in step 820 (below), these signals (bits) may be set accordingly at any time in the test flow prior to when a dataword reaches the respective switch(es).

A test data input may be selected and the ECC bypass may be disabled (step 820). The selected test data input may comprise data that will be used to test the memory, bitcell array and/or register bank for errors. The test data may be data of any kind and/or format as would be known to those of ordinary skill in the art having the benefit of this disclosure. Once a test data input is selected, the test data on the test data input may be written into the memory (e.g., an SRAM) (step 830). Once a test data input is selected, test data may be provided to ECC encode logic (step 833). The ECC encode logic may generate and/or provide ECC bits associated with the test data to the memory (step 835); the ECC bits may be written into the memory (step 837). It should be noted that step 830 and steps 833, 835 and 837 may be performed at the same time, at substantially the same time, in parallel or in series. Step 830 may begin or end before or after steps 833, 835 and 837.

Once the test data and/or the associated ECC bits are written into and stored in the memory, the test data and/or the associated ECC bits may then be read from the memory (step 840). An error may be introduced into the test data by providing an ECC error injection signal (e.g., ECCERROR 512) (step 850). For example, a switch (e.g., 540b) may have two inputs corresponding to an unaltered data stream and to a data stream with an injected error. In one embodiment, an error may be injected into the test data using an inverter (e.g., inverter 535) connected to one of the switch inputs. The ECC error injection signal may indicate that a bit in the test data stream be flipped (e.g., change a bit from a logical '1' to a logical '0' or vice versa) (step 850) by selecting the switch input connected to the inverter or other error inducing mechanism. Once an error is introduced, the test data and the related ECC bits may be input into an ECC decode logic block (e.g., 530b) (step 863). The ECC decode logic block may then test for errors in the test data (step 865) by, for example, testing/analyzing the test data read from the memory in conjunction with the ECC bits related to the test data. Different conclusions may be reached depending on how many errors were introduced in the "read" bitstream. If no memory errors are detected (step 870), the flow may proceed to perform the second memory test again (step 890) or the flow may end (step 895). If a memory error is detected (step 870), and two or more errors had been introduced and detected in the "read" data bitstream (step 875) the DED (Double Error Detect) 593 bit may be set, and a conclusion that the ECC logic is functioning correctly may be reached (step 885). If zero errors had been introduced in the "read" bitstream, it may be concluded that no memory errors are detected in the memory test (step 870), the SEC 595 bit may be set (step 872), and the test may end (step 895) or be run again (step 890). If one error had been introduced in the "read" data bitstream and a memory error is detected, a conclusion that there is a hard fault in the ECC logic may be reached and reported (step 880) (as it may be expected that there would be no faults detected with only one error—i.e., ECC logic is supposed to correct a single error and set the SEC 595 bit). The second memory test may be repeated one or more times (from step 890), first by introducing a single error at every position in the "read" bitstream and looking for the SEC 595 bit to be set in each case. The second memory test may also be repeated additional times (from step 890) by introducing two errors at various positions in the "read" bitstream and looking for DED 593 bit to be set, and looking for the memory test to detect memory errors. It should be noted that while not explicitly illustrated in FIG. 8, the detection and repair of detected memory errors may occur one or more times and may include SEC 595 and/or DED 593. That is, the repair of memory errors detected during the first memory test may continue until all or substantially (e.g., 90%, 95% or 99%) all of the memory errors are detected and/or repaired. Once memory errors are repaired/corrected, the flow may proceed to perform the second memory test again (step 890) or end (step 895).

Figure 9:
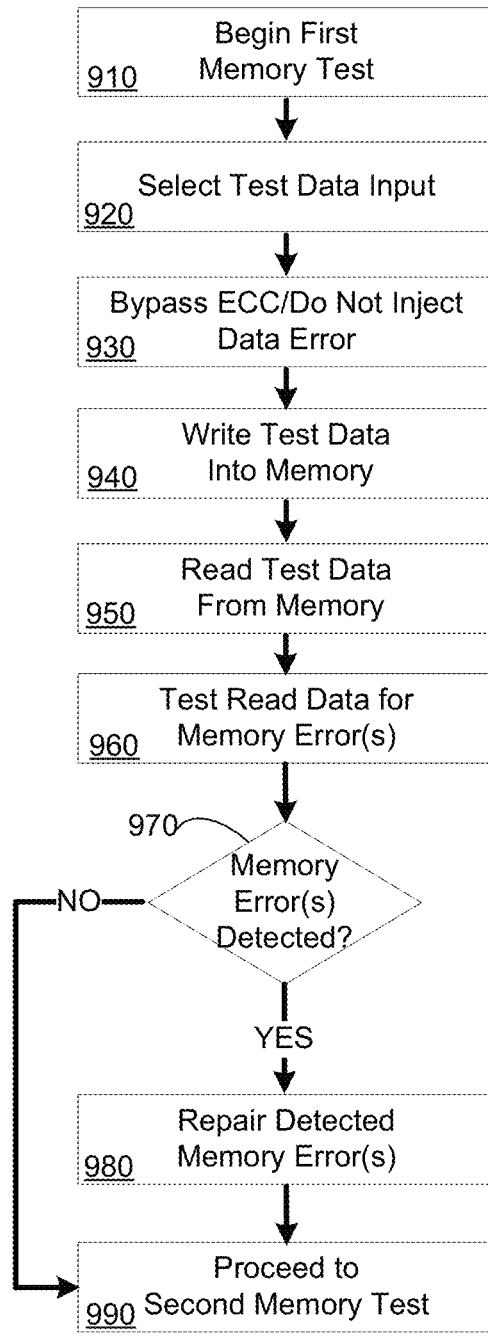
FIG. 9 illustrates a first error test flowchart for a memory, according to one embodiment.

Turning now to FIG. 9, in accordance with one or more embodiments, a flowchart depicting a first test for testing a memory is shown. At step 910, a first memory test may begin or be initiated. The first memory test may be designed to test a memory, bitcell array and/or register bank for errors such as hard errors. Hard errors may be defects in the structure and/or physical aspects of the memory and/or the like. A test data input may comprise a dataword and may be selected (step 920). The selected test data input may comprise data that will be used to test the memory, bitcell array and/or register bank for errors. The test data may be data of any kind and/or format as would be known to those of ordinary skill in the art having the benefit of this disclosure. The ECC functionality may be bypassed and any ECC error injection may not be performed (step 930). The test data on the test data input may be written into the memory (e.g., an SRAM) (step 940). Writing the test data into the memory may or may not include writing ECC data bits associated with the test data, in accordance with various embodiments, although it should be noted that ECC functionality may be bypassed during the first memory test. The ECC functionality may be bypassed, in one embodiment, by setting the ECCERROR 613 bits to zero and the ECCBYPASS 614 bit(s) to one, as described above with respect to FIG. 6.

The test data may then be read from the memory (step 950) and any steps related to the ECC data bits may be bypassed. That is, the functionality of any ECC logic may, at this point, continue to be bypassed. Any steps related to the ECC data bits may still be performed (or not), but any results and/or determinations may be ignored or not acted upon. Bypassing the ECC functionality may, in one or more embodiments, be performed by selecting an input of a switch(es) (e.g., the switches 640c-d of FIG. 6 using the ECCBYPASS 614) in order to bypass any ECC functionality. The memory may then be tested for errors (step 960) by, for example, testing/analyzing the test data read from the memory. If no memory errors are detected (step 970), the flow may proceed to the second memory test (step 990 to step 1010 (FIG. 10, below)). If a memory error(s) is(are) detected (step 970), the flow may proceed and repair and/or correct the detected memory error(s) (step 980). It should be noted that while not explicitly illustrated in FIG. 9, the detection and repair of detected memory errors may occur one or more times. That is, the repair of memory errors detected during the first memory test may continue until all or substantially all (e.g., 90%, 95% or 99%) of the memory errors are detected and/or repaired. Once memory errors are repaired/corrected, the flow may proceed to the second memory test (at step 990 to step 1010 (FIG. 10, below)).

It should be noted that while the bypassing of ECC functionality is shown at step 930, the ECCERROR 613 bits and the ECCBYPASS 614 bit(s) as shown above, for example, may be set accordingly at any time in the test flow prior to when a dataword reaches the respective switches.

Figure 10:
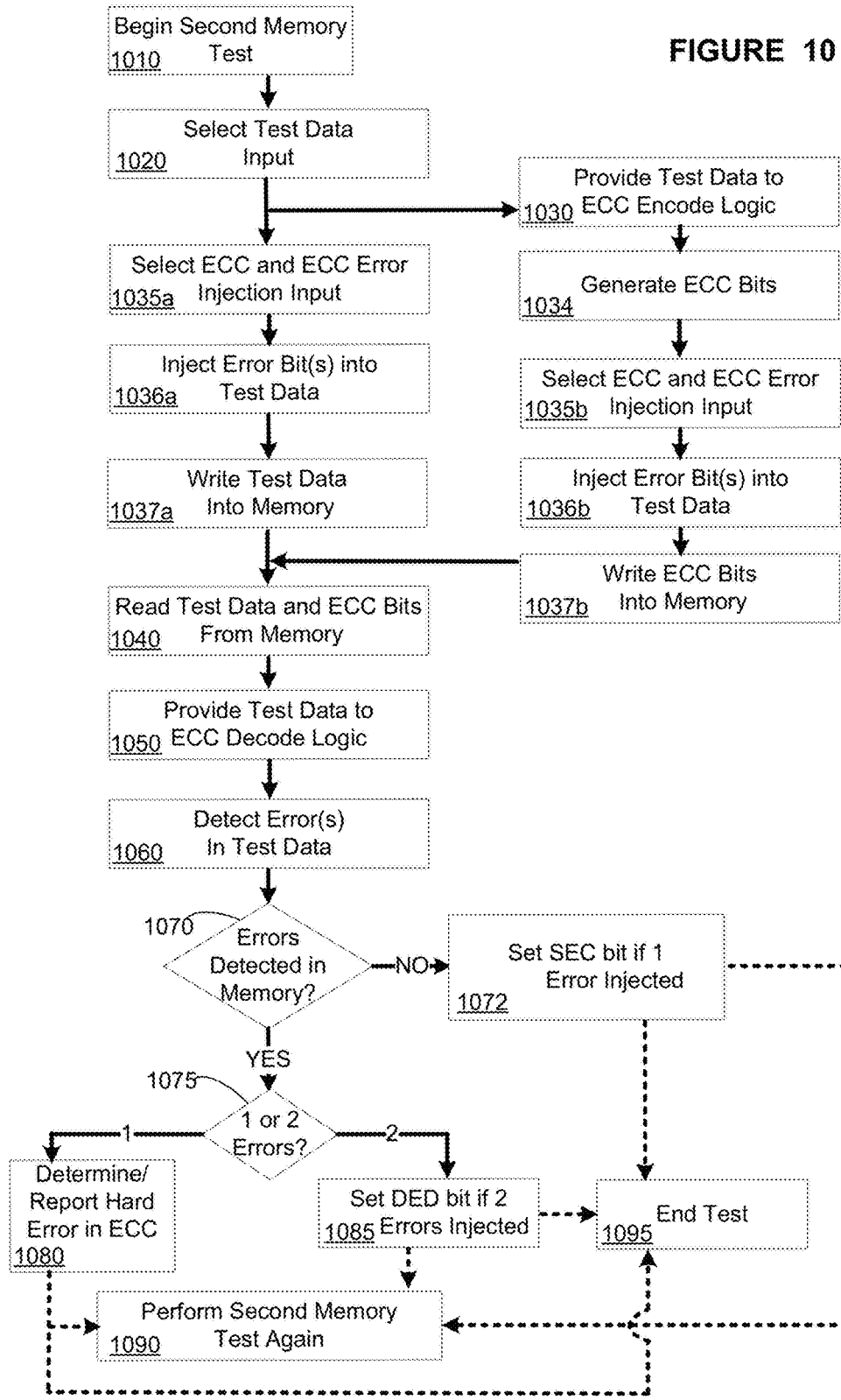
FIG. 10 illustrates a second error test flowchart for a memory, according to one embodiment.

Turning now to FIG. 10, in accordance with one or more embodiments, a flowchart depicting a second test for testing a memory is shown. At step 1010, a second memory test may begin or be initiated. The second memory test may be designed to test embedded or non-embedded ECC logic associated with a memory, bitcell array and/or register bank. The second memory test may, in one embodiment, test the associated ECC logic by simulating one or more soft errors in a memory or its associated data (e.g., a flipped bit in a dataword written to a memory, bitcell array and/or register bank). Soft errors may occur due to cosmic rays, flipping of bits in the memory and/or the like. The ECC functionality may be enabled, in one embodiment for example, and as shown above, by setting the ECCBYPASS 614 bit(s) to zero, as described above with respect to FIG. 6. Likewise, errors may be injected into test data (ECC data and/or non-ECC data) by setting one or more of the ECCERROR 613 bits to one. An ECCERROR 613 bit set to one simulates an error for a bit corresponding to that position in a dataword. It should be noted that while the ECCERROR 613 bits and the ECCBYPASS 614 bit(s) are shown as being selected/set in steps 1035a,b (below), these signals (bits) may be set accordingly any time in the test flow prior to when a dataword reaches the respective switch(es).

A test data input may be selected (step 1020). The selected test data input may comprise data that will be used to test the memory, bitcell array and/or register bank for errors. The test data may be data of any kind and/or format and may comprise a dataword, as would be known to those of ordinary skill in the art having the benefit of this disclosure. Once a test data input is selected, the test data (e.g., dataword) may be provided to ECC encode logic (step 1030). The ECC encode logic may generate ECC bits associated with the test data (step 1034).

At steps 1035a and 1035b, the ECC bypass may be disabled (i.e., the ECC logic will be enabled) and an error bit injection may be selected for the non-ECC data bits and the ECC data bits respectively. At steps 1036a and 1036b, the error bits may be injected into the non-ECC data and the ECC data respectively. An error may be introduced into the test data (ECC data and/or non-ECC data) by providing an ECC error injection signal (e.g., ECCERROR 613), for example, at a switch(es) (e.g., 640b,e). In one embodiment, an error may be injected into the test data using an inverter(s) (e.g., the inverters 635a-b) connected to one of the switch inputs (e.g., the switches 640*b,e*). The ECC error injection signal may indicate that a bit in the test data stream be flipped (e.g., change a bit from a logical '1' to a logical '0' or vice versa) by selecting the switch input connected to the inverter or other error inducing mechanism. At steps 1037*a* and 1037*b*, the non-ECC data bits and the ECC data bits (respectively) may be written into the memory/bitcell array. It should be noted that the group of steps 1030, 1034, 1035*b*, 1036*b* and 1037*b* and the group of steps 1035*a*, 1036*a* and 1037*a* may be performed at the same time, at substantially the same time, in parallel or in series. Steps 1030, 1034, 1035*b*, 1036*b* and/or 1037*b* may begin or end before or after steps 1035*a*, 1036*a* and 1037*a*, or simultaneously or substantially simultaneously as these steps.

Once the test data and/or the associated ECC bits are written into and stored in the memory/bitcell array, the test data and/or the associated ECC bits may then be read from the memory/bitcell array (step 1040). The non-ECC test data and the related ECC bits may be input into an ECC decode logic block (e.g., 630*b*) (step 1050). The ECC decode logic block may then test for errors in the test data (step 1060) by, for example, testing/analyzing the test data read from the memory in conjunction with the ECC bits related to the test data. Different conclusions may be reached depending on how many errors were introduced in the "write" bitstream during the memory test. If no memory errors are detected (step 1070), the flow may proceed to perform the second memory test again (step 1090) or the flow may end (step 1095). If a memory error is detected (step 1070), and two or more errors had been introduced and detected in the "write" data bitstream (step 1075) the DED (Double Error Detect) 693 bit may be set, and a conclusion that the ECC logic is functioning correctly may be reached (step 1085). If zero errors had been introduced in the "write" bitstream, it may be concluded that no memory errors are detected in the memory test (step 1070), the SEC 695 bit may be set (step 1072), and the test may end (step 1095) or be run again (step 1090). If one error had been introduced in the "write" data bitstream and a memory error is detected, a conclusion that there is a hard fault in the ECC logic may be reached and reported (step 1080) (as it may be expected that there would be no faults detected with only one error—i.e., ECC logic is supposed to correct a single error and set the SEC 695 bit). The second memory test may be repeated one or more times (from step 1090), first by introducing a single error at every position in the "write" bitstream and looking for the SEC 695 bit to be set in each case. The second memory test may also be repeated additional times (from step 1090) by introducing two errors at various positions in the "write" bitstream and looking for DED 693 bit to be set, and looking for the memory test to detect memory errors. It should be noted that while not explicitly illustrated in FIG. 10, the detection and repair of detected memory errors may occur one or more times and may include SEC 695 and/or DED 693. It should be noted that while not explicitly illustrated in FIG. 10, the detection and repair of detected memory errors may occur one or more times and may include SEC and/or DED. That is, the repair of memory errors detected during the first memory test may continue until all or substantially (e.g., 90%, 95% or 99%) all of the memory errors are detected and/or repaired. Once memory errors are repaired/corrected, the flow may proceed to perform the second memory test again (step 1090) or end (step 1095).

It is also contemplated that, in some embodiments, different kinds of hardware descriptive languages (HDL) may be used in the process of designing and manufacturing very large scale integration circuits (VLSI circuits) such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., data storage units 160, RAMs 130 & 155, compact discs, DVDs, solid state storage and the like). In one embodiment, the GDSII data (or other similar data) may be adapted to configure a manufacturing facility (e.g., through the use of mask works) to create devices capable of embodying various aspects of the instant invention. In other words, in various embodiments, this GDSII data (or other similar data) may be programmed into a computer 100, processor 125/140 or controller, which may then control, in whole or part, the operation of a semiconductor manufacturing facility (or fab) to create semiconductor products and devices. For example, in one embodiment, silicon wafers containing embedded memory(ies) 130 comprising embedded ECC logic 410 may be created using the GDSII data (or other similar data).

It should also be noted that while various embodiments may be described in terms of embedded memory for graphics processing and/or computing, it is contemplated that the embodiments described herein may have a wide range of applicability, not just for graphics/computing processes, as would be apparent to one of skill in the art having the benefit of this disclosure.

The particular embodiments disclosed above are illustrative only, as the invention may be modified and practiced in different but equivalent manners apparent to those skilled in the art having the benefit of the teachings herein. Furthermore, no limitations are intended to the details of construction or design as shown herein, other than as described in the claims below. It is therefore evident that the particular embodiments disclosed above may be altered or modified and all such variations are considered within the scope and spirit of the claimed invention.

Accordingly, the protection sought herein is as set forth in the claims below.

What is claimed:

1. A method comprising:
    performing a first error test on a memory, the memory comprising an integrated error correcting code (ECC) portion, wherein the functionality of the ECC portion is bypassed during the first error test;
    performing a second error test of the memory, wherein the second error test includes testing the functionality of the ECC portion and performing an ECC test upon at least a portion of ECC data;
    inserting at least one error bit into the ECC data during performance of the second error test;
    performing the second error test one or more additional times; and
    shifting the at least one error bit across the ECC data for each of the one or more additional times the second error test is performed.

2. The method of claim 1, further comprising:
    determining whether an error is present in the memory based at least upon the first error test.

3. The method of claim 2, further comprising:
correcting at least one identified error in the memory in response to determining that an error is present in the memory.

4. The method of claim 1, further comprising:
providing a first value for a selection signal to indicate that the functionality of the ECC portion is to be bypassed.

5. The method of claim 4, further comprising:
providing a second value for the selection signal to indicate that the error test is to include testing the functionality of the ECC portion.

6. An apparatus, comprising:
a memory device;
an error correcting code (ECC) circuit communicatively coupled to the memory device;
a first switching device communicatively coupled to the memory device and a first portion of the ECC circuit, the first switching device being configured to select at least one of a first input signal or a second input signal;
a second switching device communicatively coupled to the memory device and a second portion of the ECC circuit, the second switching device being configured to select at least one of a signal from the memory device or a signal from the second portion of the ECC circuit, wherein the signal from the memory device and the signal from the second portion of the ECC circuit are related to at least one of the first input signal or the second input signal;
a first error generating device communicatively coupled to at least one of the memory device or the first switching device, the first error generating device being configured to insert an error into a stream of data; and
a third switching device communicatively coupled to the first error generating device, to the memory device and to at least one of the second portion of the ECC circuit or the first switching device, the third switching device being configured to select at least one of an output of the first error generating device and at least one of data from the memory device or an output of the first switching device.

7. The apparatus of claim 6, wherein the memory device includes a first portion configured to store at least one of read data or write data, and a second portion configured to store ECC data.

8. The apparatus of claim 6, wherein the first portion of the ECC circuit is communicatively coupled to an input of the first switching device.

9. The apparatus of claim 6, further comprising:
a second error generating device communicatively coupled to a third input signal, the second error generating device being configured to insert an error into a stream of data; and
a fourth switching device communicatively coupled to the second error generating device, to the memory device and to the third input signal, the fourth switching device being configured to select at least one of the output of the second error generating device and the third input signal.

10. The apparatus of claim 9, wherein the first and second error generating devices each comprise an inverter, and wherein the inserted errors are inverted bits.

11. A non-transitory, computer readable storage device encoded with data that, when implemented in a manufacturing facility, configures the manufacturing facility to create an apparatus, where the apparatus comprises:
a memory device;
an error correcting code (ECC) circuit communicatively coupled to the memory device;
a first switching device communicatively coupled to the memory device and a first portion of the ECC circuit, the first switching device being configured to select at least one of a first input signal or a second input signal;
a second switching device communicatively coupled to the memory device and a second portion of the ECC circuit, the second switching device being configured to select at least one of a signal from the memory device or a signal from the second portion of the ECC circuit, wherein the signal from the memory device and the signal from the second portion of the ECC circuit are related to at least one of the first input signal or the second input signal;
a first error generating device communicatively coupled to at least one of the memory device or the first switching device, the first error generating device being configured to insert an error into a stream of data; and
a third switching device communicatively coupled to the first error generating device, to the memory device and to at least one of the second portion of the ECC circuit or the first switching device, the third switching device being configured to select at least one of an output of the first error generating device and at least one of data from the memory device or an output of the first switching device.

12. A non-transitory, computer readable storage device, as set forth in claim 11, encoded with data that, when implemented in a manufacturing facility, configures the manufacturing facility to create an apparatus wherein the memory device includes a first portion configured to store at least one of read data or write data, and a second portion configured to store ECC data.

13. A non-transitory, computer readable storage device, as set forth in claim 11, encoded with data that, when implemented in a manufacturing facility, configures the manufacturing facility to create an apparatus wherein the first portion of the ECC circuit is communicatively coupled to an input of the first switching device.

14. A non-transitory, computer readable storage device, as set forth in claim 11, encoded with data that, when implemented in a manufacturing facility, configures the manufacturing facility to create an apparatus, where the apparatus further comprises:
a second error generating device communicatively coupled to a third input signal, the second error generating device being configured to insert an error into a stream of data; and
a fourth switching device communicatively coupled to the second error generating device, to the memory device and to the third input signal, the fourth switching device being configured to select at least one of the output of the second error generating device and the third input signal.

15. A non-transitory, computer readable storage device, as set forth in claim 14, encoded with data that, when implemented in a manufacturing facility, configures the manufacturing facility to create an apparatus, wherein the first and second error generating devices each comprise an inverter, and wherein the inserted errors are inverted bits.

16. A non-transitory, computer readable program storage device encoded with instructions that, when executed by a processing device, perform a method, where the method comprises:

performing a first error test on a memory, the memory comprising an integrated error correcting code (ECC) portion, wherein the functionality of the ECC portion is bypassed during the first error test;

performing a second error test of the memory, wherein the second error test includes testing the functionality of the ECC portion and performing an ECC test upon at least a portion of ECC data;

inserting at least one error bit into the ECC data during the performance of the second error test;

performing the second error test one or more additional times; and shifting the at least one error bit across the ECC data for each of the one or more additional times the second error test is performed.

17. The non-transitory, computer readable program storage device encoded with instructions that, when executed by a processing device, performs the method of claim 16, further comprising:

determining whether an error is present in the memory based at least upon the first error test.

18. The non-transitory, computer readable program storage device encoded with instructions that, when executed by a processing device, performs the method of claim 17, further comprising:

correcting at least one identified error in the memory in response to determining that an error is present in the memory.

19. The non-transitory, computer readable program storage device encoded with instructions that, when executed by a processing device, performs the method of claim 16, further comprising:

providing a first value for a selection signal to indicate that the functionality of the ECC portion is to be bypassed.

20. The non-transitory, computer readable program storage device encoded with instructions that, when executed by a processing device, performs the method of claim 19, further comprising:

providing a second value for a selection signal to indicate that the error test is to include testing the functionality of the ECC portion.

* * * * *